(No Model.)
H. R. BARNHURST.
DEVICE FOR KEEPING CRANK PINS COOL.
No. 262,920. Patented Aug. 22, 1882.
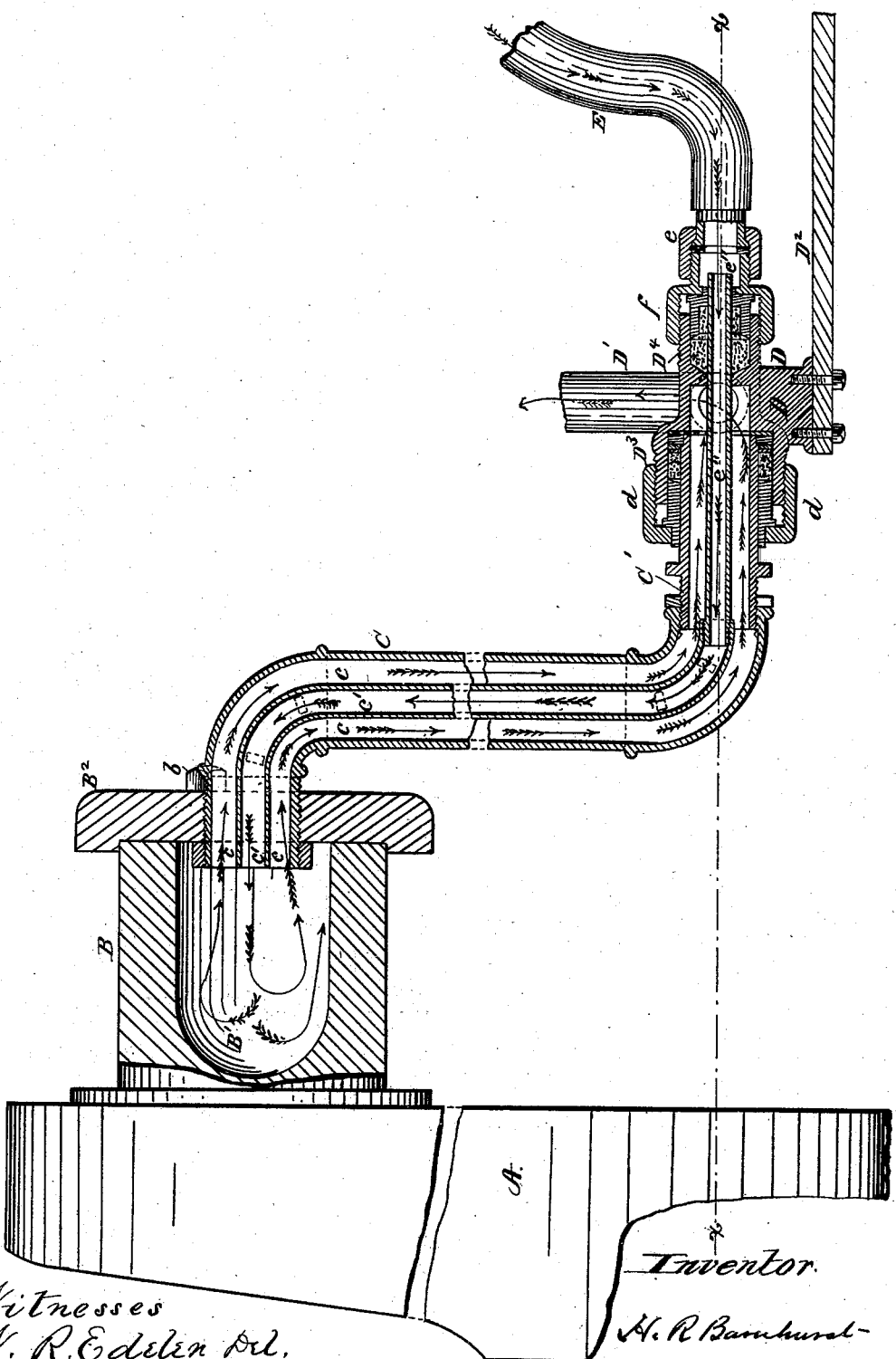

UNITED STATES PATENT OFFICE.

HENRY R. BARNHURST, OF ERIE, PENNSYLVANIA.

DEVICE FOR KEEPING CRANK-PINS COOL.

SPECIFICATION forming part of Letters Patent No. 262,920, dated August 22, 1882.

Application filed July 10, 1882. (No model.)

*To all whom it may concern:*

Be it known that I, HENRY R. BARNHURST, a citizen of the United States, residing at Erie, in the county of Erie and State of Pennsylvania, have invented certain new and useful Improvements in Devices for Keeping Crank-Pins Cool; and I do hereby declare the following to be a full, clear, and exact description of the invention, such as will enable others skilled in the art to which it appertains to make and use the same.

My invention consists in providing means for keeping the crank-pins of engines and like machinery cool by the application of a stream of water to a cavity formed within the same.

My invention is illustrated in the accompanying drawing as follows:

A is the crank. B is the crank-pin. (Shown in vertical longitudinal section.) B' is a cavity formed within the crank-pin B. $B^2$ is a cap covering said cavity, and secured upon the pin by screws b. C is a two-way pipe (shown in longitudinal section) which supplies water to and conveys it away from the cavity B'. X X represent the center line of the shaft, and the pipe C extends from its connections where centered on this line to the crank-pin, and passes through the cap $B^2$ into the cavity B'. The pipe C is in general form crank-shaped, and connects at the center line with a horizontal section of pipe, C'. D is a fitting which is fixed onto a support, $D^2$, and has a discharge-pipe, D', extending therefrom, a branch, $D^3$, for connecting with the pipe C', and a second branch for connecting with the supply-hose E.

The object of the construction shown is to keep up a current of cool water within the cavity within the pin B, and thereby prevent the journal there becoming hot. The pipe C is formed in two parts, or rather with two ways, one of which, c', is concentrically arranged within the other, but not necessarily so. The object of these two passages c c' is to allow the water to flow in through one, c', and out through the other, c. This pipe may be all one casting, or it may be formed of tubing, or it may have elbows of cast-iron and the intermediate parts of tubing. It screws into the cap $B^2$ and extends back to the center line, X X, and is there concentric with it, giving the said pipe a crank-like form. At the center point the pipe C connects with a short section of pipe, C', and the inner pipe, c', connects with a section, c'', contained in C'.

The pipe C' connects with the branch $D^3$ of the casting D by a stuffing-box, d, and the section c'' passes on through a stuffing-box, f, on the branch $D^4$. The discharge-pipe D' opens into the chamber of the branch $D^3$, and thus connects with the passage c. The passage c' or c'' opens beyond the stuffing-box f and within the supply-pipe connection e. The arrows show the course of the water. The circulation is not in any way dependent upon the heat which may be generated at the wrist-pin, but is wholly caused by pressure within the supply-pipe. The stuffing-boxes allow the pipes to revolve around the center line, X X, without leakage. The constant flow of water through the cavity B' in the manner described keeps the pin perfectly cool and entirely prevents the heating of that journal. The support $D^2$, to which the fitting D is attached, as shown in the drawing, is a spring—either a metallic spring or a spring-board. The object of this is to give the bearing flexibility, so that any inaccuracies in centering the parts will be compensated for in the flexibility of the bearing-support. Any other form of spring may be used in this place—as, for instance, a block of rubber or a coil-spring.

What I claim as new is—

1. The combination, with a crank-pin, of a pipe having an inflow and outflow passage, which pipe extends to and is concentrically journaled on the center line of the shaft and is there connected with a water-supply pipe, substantially as and for the purposes mentioned.

2. The combination, with a crank-pin having therein a cavity, of a pipe having an inflow and an outflow passage communicating with said cavity, and with a water-supply pipe located at the center line of the shaft, substantially as and for the purposes set forth.

3. The combination, with the crank-pin B, having the cavity B', of the cap $B^2$, the two-way pipes C C', the fixture D, having branches D' $D^3$ $D^4$, the stuffing-boxes d and f, and the supply-pipe E, substantially as and for the purposes set forth.

4. The combination, with the crank-pin B, pipe C, and fitting D, of a flexible support for said fitting, substantially as and for the purposes mentioned.

In testimony whereof I affix my signature in presence of two witnesses.

HENRY R. BARNHURST.

Witnesses:
JNO. K. HALLOCK,
W. R. EDELEN.